Aug. 9, 1960  B. T. NEAL  2,948,164
AUTOMATIC TRANSMISSION
Filed May 24, 1957  3 Sheets-Sheet 1

INVENTOR.
BENJAMIN T. NEAL
BY
Schmieding and Fultz
ATTORNEYS

United States Patent Office 2,948,164
Patented Aug. 9, 1960

2,948,164

AUTOMATIC TRANSMISSION

Benjamin T. Neal, 91 Acton Road, Columbus, Ohio

Filed May 24, 1957, Ser. No. 661,499

5 Claims. (Cl. 74—705)

This invention relates to transmissions for changing the gear ratio between a prime mover and a load, and particularly to a novel transmission apparatus that incorporates mechanical means for automatically producing an infinite number of gear ratios throughout a desired range thereof.

In general, the apparatus of the present invention incorporates a housing that carries an input shaft connectable with a prime mover, such as an automobile engine, and an output shaft connectable to a load, such as the driving wheels of a vehicle. The input and output shafts are mechanically connected together by a novel gear mechanism adapted to rotate the housing for the apparatus. A braking means is provided for retarding rotation of the housing to establish a driving connection between the above mentioned input and output shafts. When the braking means for the rotatable housing is in a released position, rotation of the input shaft imparts rotation to the housing without imparting rotation to the output shaft. When the braking means is applied to the housing the output shaft starts to rotate at a reduced speed relative to the input shaft with a high torque output being delivered to the load. The mechanism then automatically increases the speed of the output shaft, relative to the input shaft, with a decrease in torque output to the load, up to the maximum designed output shaft speed.

It is therefore an object of the present invention to provide a novel transmission apparatus that automatically changes gear ratio solely by mechanical means.

It is another object of the present invention to provide an improved transmission that automatically changes gear ratio by means of a novel relatively simple gear mechanism that incorporates a minimum of moving parts.

It is still another object of the present invention to provide a novel automatic transmission that automatically changes gear ratio and at the same time transmits power from a prime mover to a load with a high degree of efficiency.

Further objects and advantages of the present invention will be apparent from the following description, reference being had to the accompanying drawings wherein a preferred form of embodiment of the invention is clearly shown.

Figure 1:
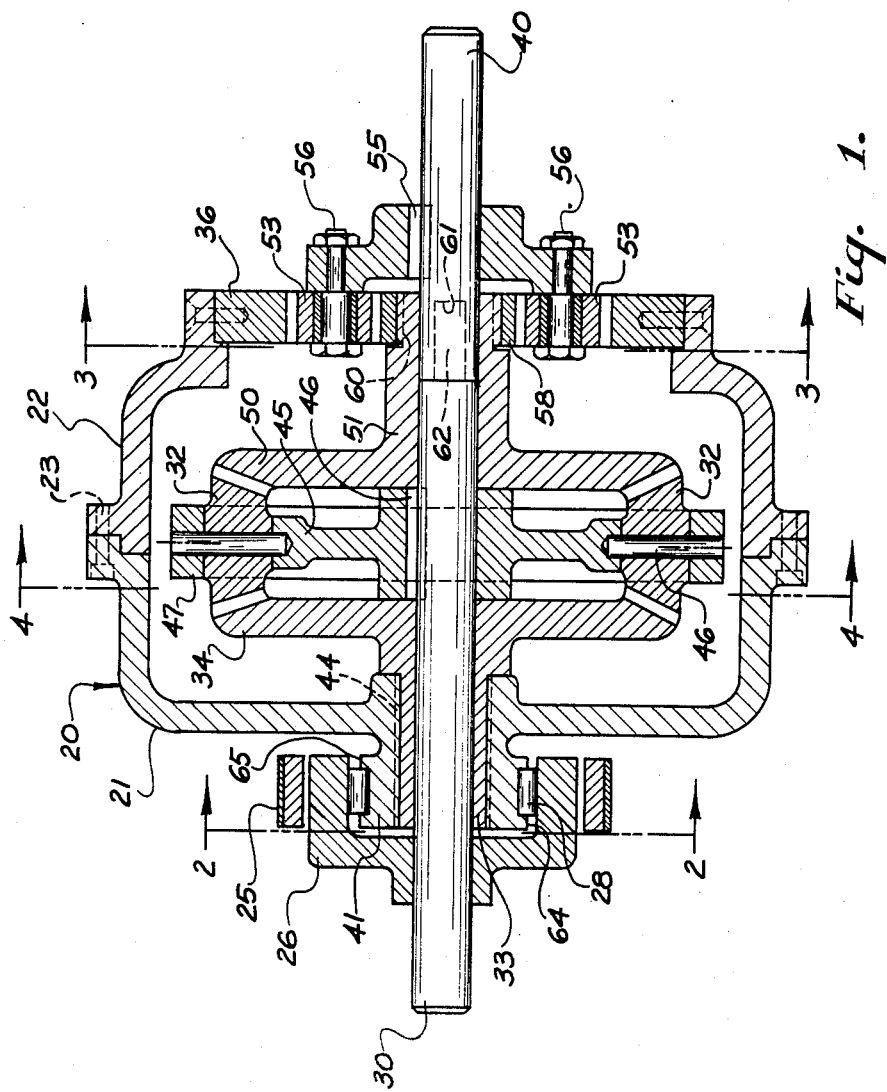
Figure 1 is a side sectional view of a transmission constructed according to the present invention, the section being taken along the line 1—1 of Figure 4.
Figure 2:
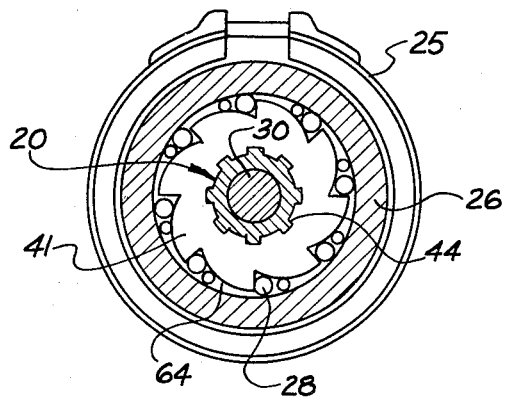
Figure 2 is an end sectional view of the transmission of Figure 1 with the section being taken along the line 2—2 of Figure 1.

Referring in detail to the drawing, Figure 1 illustrates a transmission, constructed according to the present invention, which includes a housing, indicated generally at 20, formed by a front housing portion 21 joined to a rear housing portion 22 by means of a plurality of studs 23. Front housing portion 21 includes a hub 41 that is secured to a hub 33 of a front beveled gear 34 by means of a spline 44. A front carrier 45 is secured to an input shaft 30 by a key 46 and a plurality of beveled planetary gears 32 are rotatably mounted on front carrier 45 by means of a plurality of pins 46 and an annular member 47.

A rear beveled gear 50 is in mesh with beveled planetary gears 32 including a hub 51 that rotatably receives the rear end of input shaft 30 on the front end of an output shaft 40.

Figure 3:
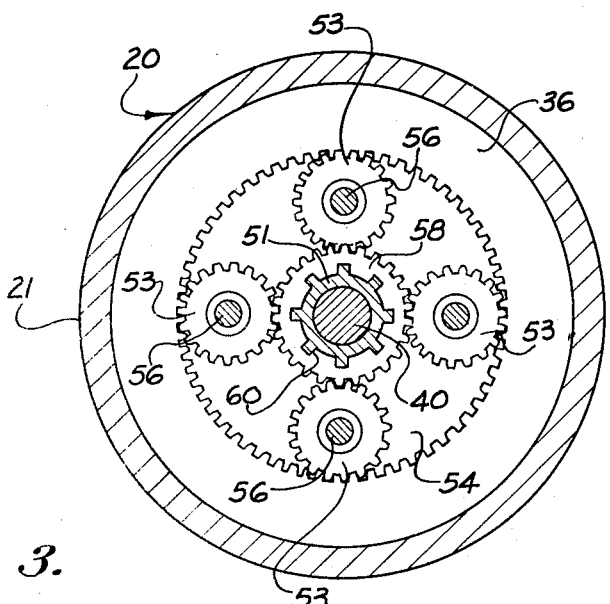
Figure 3 is a second end sectional view of the transmission of Figure 1 with the section being taken along line 3—3 of Figure 1.
Figure 4:
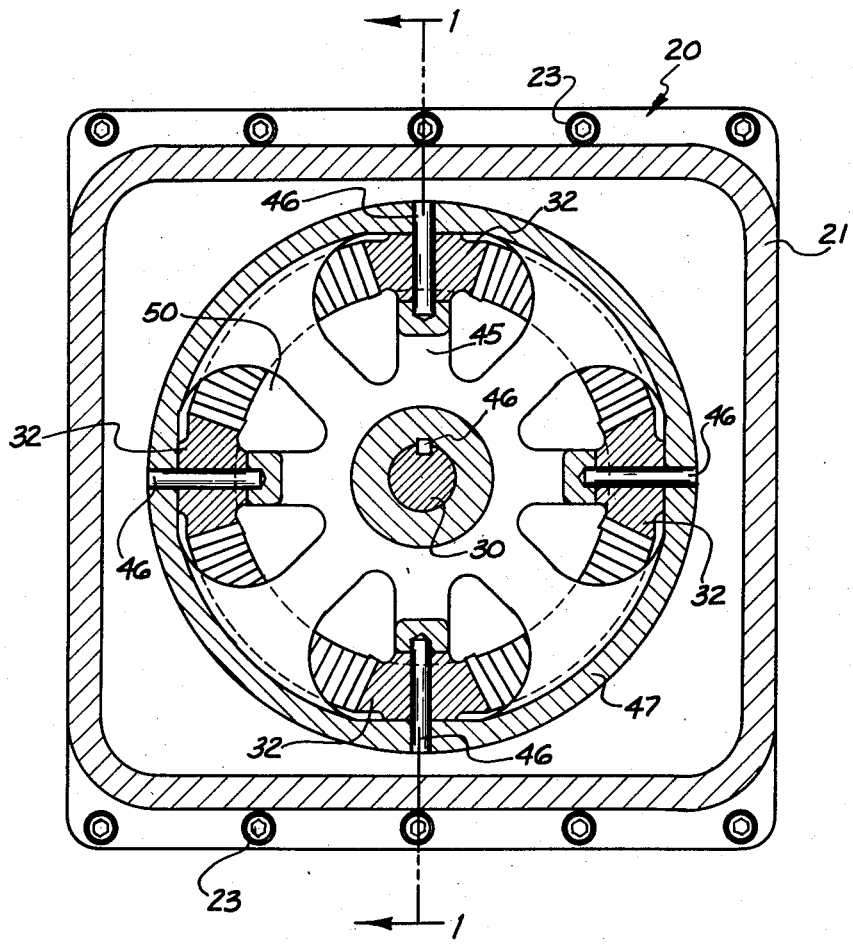
Figure 4 is a third end sectional view of the transmission of Figure 1 with the section being taken along the line 4—4 of Figure 1.

The rear end of housing 20 carries a ring gear 36 that meshes with a plurality of rear planetary gears 53 carried on a rear carrier 57 that is secured to output shaft 40 by a key 55. A plurality of bolts 56 mount the rear planetary gears 53 to rear carrier 57. A sun gear 58 is mounted on hub 51 of rear beveled gear 50 and meshes with rear planetary gears 53. As is best seen in Figure 3, sun gear 58 is keyed to hub 51 by a spline 60.

As seen in Figure 1 the front end of output shaft 40 includes a hole 61 which rotatably receives a reduced end portion 62 on the rear end of input shaft 30.

The front end of the apparatus includes a one way clutch mechanism that includes an inner clutch surface 64 formed on hub 41 and an outer clutch surface 65 formed on a clutch ring 26. A plurality of rollers 28 are disposed between inner clutch surface 64 and outer clutch surface 65. An inwardly retractable brake band 25 is secured to the frame of the vehicle, not illustrated, and is inwardly contractable into braking engagement with outer surface of clutch ring 26. In operation, when output shaft 40 is stationary such as when a vehicle is at rest, with input shaft 30 being rotated by the vehicle engine, and with brake band in the released position illustrated, housing 20 will rotate with input shaft 30 since front carrier 45 is keyed to input shaft 30 at 46 and since no braking action is being applied to housing 20. When brake 25 is actuated, however, rotation of clutch ring 26 is either resisted or completely prevented depending upon the magnitude of the braking action. Hence the rotation of housing 20 and front beveled gear 34 keyed thereto will either be retarded or completely arrested depending upon the magnitude of the braking action. When front beveled gear 34 is retarded or arrested the plurality of beveled planetary gears 32 will move around stationary front beveled gear 34. This institutes rotation of rear beveled gear 50 which in turn rotates sun gear 58 whereby rear planetary gears 53 are caused to be moved around the interior of ring gear 36. As rear planetary gears 53 move around ring gear 36, or carrier 57 imparts rotation to output shaft 40 since the carrier is keyed to the output shaft at 55.

From a consideration of Figure 1 it will be understood that the greater the braking action at brake band 25 the greater will be the retarding of rotation of housing 20. Moreover, the slower the rotation of housing 20 the faster will be the rotation of rear beveled gear 50, rear planetary gears 53 and output shaft 40. Hence it will be understood that the speed of output shaft 40 relative to the speed of input shaft 30 will increase in proportion to the braking action applied at brake band 25. Hence it will be understood that when braking action is first applied at brake band 25 output shaft 40 will be rotated at a lower gear ratio with a resulting high torque output. As the speed of output shaft increases, relative to the speed of input shaft 30, the gear ratio becomes higher with a resulting decrease in torque at the output shaft.

In operation, the transmission device of the present invention is designed to provide an infinite number of torque multiplications whatever multiplication is built into the planetary train because of difference in the diameters of sun gear 58, and ring gear 36. To accomplish such infinite number of multiplications, a unique application of a differential device and a planetary train is used. In the differential device an equal torque, in the same direction, is applied to both beveled gear 34 and beveled gear 50.

In the planetary train, when ring gear 36 is prevented from rotating in the direction opposite to that of sun gear 58 the torque multiplication is relative to the diameter of the sun gear and that of the ring gear. Also, in the planetary train, when ring gear 36 rotates in the same direction and at the same speed as sun gear 58, the torque multiplication is one to one. It will be understood that ring gear 36 of the planetary train will tend to gradually achieve the same speed as that of sun gear 58 around their common axis, and in the same direction. This gradual achievement of the same speeds provides an infinite number of torque multiplications between the multiplication of torque which would result when ring gear 36 is held stationary and when the ring gear and the sun gear 58 are rotating at the same speed.

This infinite number of torque multiplications is achieved by the unique application of a differential device in conjunction with a planetary train, as follows:

Through the differential mechanism an equal torque is applied to beveled gears 34 and 50 in the same direction as the rotation of shaft 30. The torque from beveled gear 34 is applied to ring gear 36 of the planetary train through housing portions 21 and 22. The torque from beveled gear 50 of the differential is applied to sun gear 58 of the planetary train.

The initial force applied to sun gear 58 will tend to rotate ring gear 36 in a reverse direction, however, the "one way" clutch 41, 26, and brake 25 prevents this reverse rotation when brake 25 is contracted against clutch ring 26. When such braked condition prevails, the planet gears 53 rotate around ring gear 36 in a forward direction and provide a torque multiplication, relative to the diameters of sun gear 58 and ring gear 36, which is applied to the output shaft 40, through members 56 and 57.

At the same time the above described torque multiplication is accomplished, a like force is applied to ring gear 36 of the planetary train, which force tends to rotate ring gear 36 in the same direction as the planetary gears 53 around ring gear 36. When the torque requirements of output shaft 40 equals the torque applied to the input shaft 30 the planetary train mechanism will rotate as a unit without any internal rotation of planet gears 53 around their individual axis. At this point, there will result a one to one torque multiplication. Thus, as ring gear 36 moves forward from the initial stationary position to a speed of rotation equal to the rotation of the sun gear 58, the torque multiplications will be relative to the difference in the rotating speeds of ring gear 36 and planet gears 53 around their common axis, thus achieving an infinite number of multiplications between the multiplication when the ring gear 36 is stationary and when its rotation is equal to that of sun gear 58.

To properly evaluate this type of transmission, it should be pointed out that any transmission performs three separate functions: (1) Provides a balance with the desired acceleration of a vehicle; (2) provides a balance between input torque and that required to negotiate a hill; (3) provides a balance between the maximum speed of the vehicle and the input torque.

In conventional transmissions in which a number of separate gear ratios are provided by a like number of separate gear mechanisms, the operator of the vehicle is required to shift the gears by hand, or it may be done by automatic controls. However, in the operation of such transmission there are as many gaps in a perfect balance between input torque and the speeds of the vehicle as there are separate gear ratio mechanisms.

With the apparatus of the present invention, however, there is an automatic and instantaneous balance between torque input and vehicle speed. Thus, instead of power from the motor being absorbed within the motor itself, such power is applied to the shaft which drives the wheels of the vehicle. Thus the transmission of the present invention will achieve a maximum of propulsion efficiency in transmitting what is commonly termed usable power to the wheels of the vehicle.

While the form of embodiment of the present invention as herein disclosed constitutes a preferred form, it is to be understood that other forms might be adopted, all coming within the scope of the claims which follow.

I claim:

1. A transmission apparatus comprising, in combination, an input shaft for driven connection with a prime mover; an output shaft for driving connection with a load; first and second beveled gears rotatably mounted relative to said shafts said first beveled gear including a bore surrounding said input shaft, said input shaft being rotatable in said bore; a member carried by said first beveled gear; braking means for applying braking action to said member; a carrier mounted on said input shaft in keyed relationship therewith; a plurality of beveled planetary gears mounted on said carrier and in mesh with said first and second beveled gears; a second plurality of planetary gears carried by said output shaft; a ring gear carried by said first beveled gear and in mesh with said second plurality of planetary gears; a sun gear carried by said second beveled gear and in mesh with said second plurality of planetary gears; and means for retarding rotation of said first beveled gear independently of said input shaft, said second beveled gear and said sun gear being mounted on a hub that forms a bearing hole for said input and output shafts.

2. A transmission apparatus comprising, in combination, an input shaft for driven connection with a prime mover; an output shaft for driving connection with a load; a first beveled gear including a bore surrounding said input shaft, said input shaft being rotatable in said bore; a member carried by said first beveled gear; braking means for applying braking action to said member; a first carrier mounted on said input shaft; a first plurality of beveled planetary gears mounted on said first carrier and in mesh with said first beveled gear; a ring gear carried by said member; a second carrier mounted on said output shaft; a second plurality of planetary gears mounted on said second carrier and in mesh with said ring gear; means forming a second beveled gear in mesh with said first plurality of planetary gears and a sun gear in mesh with said second plurality of planetary gears; and clutch means operative between said braking means and said member.

3. A transmission apparatus comprising, in combination, an input shaft for driven connection with a prime mover; an output shaft for driving connection with a load; first and second beveled gears rotatably mounted relative to said shafts; said first beveled gear including a bore surrounding said input shaft, said input shaft being rotatable in said bore; a carrier mounted on said input shaft in keyed relationship therewith; a plurality of beveled planetary gears mounted on said carrier and in mesh with said first and second beveled gears; a second plurality of planetary gears carried by said output shaft; a ring gear carried by said first beveled gear and in mesh with said second plurality of planetary gears; a sun gear carried by said second beveled gear and in mesh with said second plurality of planetary gears; means for retarding rotation of said first beveled gear independently of said input shaft; and clutch means operative between said retarding means and said first beveled gear.

4. A transmission apparatus comprising, in combination, an input shaft for driven connection with a prime mover; an output shaft for driving connection with a load; first and second beveled gears rotatably mounted relative to said shafts; said first beveled gear including a bore surrounding said input shaft, said input shaft being rotatable in said bore; a member carried by said first beveled gear; braking means for applying braking action to said member; a carrier mounted on said input shaft in keyed relationship therewith; a plurality of beveled planetary gears in mesh with said first and second beveled gears; a second plurality of planetary gears carried by said output shaft; a ring gear carried by said first beveled gear and in mesh with said second plurality of planetary gears; a sun gear carried by said second beveled gear and in mesh with said second plurality of planetary gears; and clutch means operative between said braking means and said member.

5. A transmission apparatus comprising, in combination, an input shaft for driven connection with a prime mover; an output shaft for driving connection with a load; first and second beveled gears rotatably mounted relative to said shafts, said first beveled gear including a bore surrounding said input shaft, said input shaft being rotatable in said bore; a first clutch element mounted to said first beveled gear; a second clutch element surrounding said first clutch element; a plurality of rollers interposed between said two clutch elements; braking means for applying braking action to said second clutch element; a carrier mounted on said input shaft in keyed relationship therewith; a plurality of beveled planetary gears in mesh with said first and second beveled gears; a second plurality of planetary gears carried by said output shaft; a ring gear carried by said first beveled gear and in mesh with said second plurality of planetary gears; and a sun gear carried by said second beveled gear and in mesh with said second plurality of planetary gears.

References Cited in the file of this patent

UNITED STATES PATENTS

| 2,149,320 | Szekely | Mar. 7, 1939 |
| 2,559,128 | McFarland | July 3, 1951 |

FOREIGN PATENTS

| 738,498 | Great Britain | Oct. 12, 1955 |
| 64,841 | France | Dec. 13, 1955 |